Patented Feb. 19, 1924.

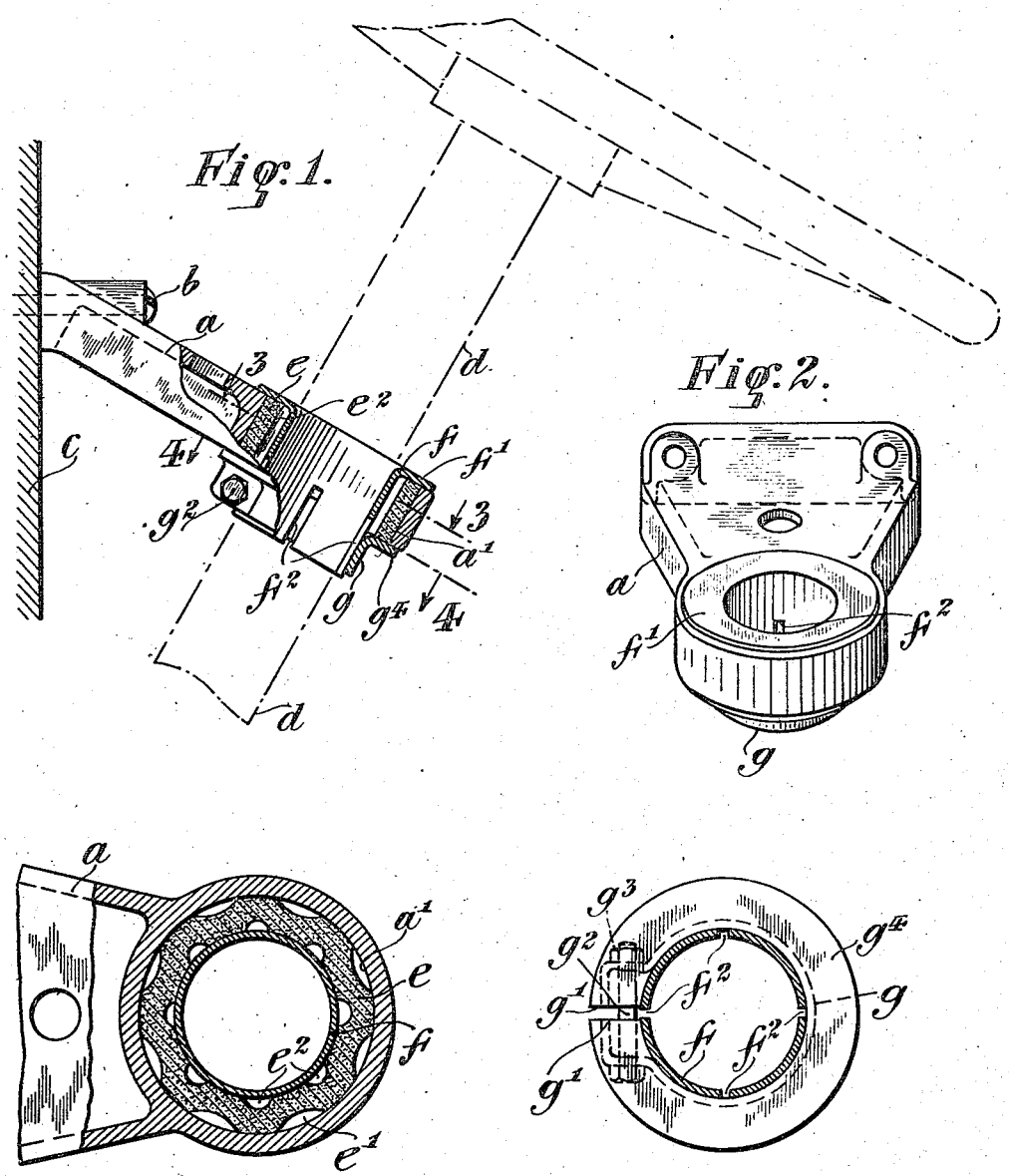

1,483,903

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

MOUNTING FOR STEERING POSTS AND THE LIKE.

Application filed November 21, 1921. Serial No. 516,567.

*To all whom it may concern:*

Be it known that I, ALFRED F. MASURY, a citizen of the United States, residing in the borough of Manhattan, of the city of New York, in the State of New York, have invented certain new and useful Improvements in Mountings for Steering Posts and the like, of which the following is a specification, reference being had to the accompanying drawing, forming a part hereof.

In automobile construction situations are rather common in the assembling of parts where it is difficult to provide the necessary tolerances required to aline the parts. Manufacturing considerations would make the expense of machining and alining nicely fitting parts so great as to be prohibitive for production on an ordinary commercial scale. The problem is encountered, for instance, in assembling and alining the steering post in the dash or floor, the distance between bearing points being so great along the column that errors in machining, wood turning, assembling etc. are greatly magnified. The invention, therefore, finds its most useful application to a mounting for a steering post which will conveniently and inexpensively afford the necessary tolerance, facilitate assembling, and hold the post yieldingly in its proper relation to surrounding parts and cushion it against vibrations and shocks.

In accordance with the invention, a bracket is secured to the vehicle in proximity to the post and supports a yielding retainer, as of rubber, in alining relationship to the post. The retainer construction permits of the ready assembling of the post in its improved mounting and the securing of the retainer against displacement within the bracket. In accordance with a further object of the invention, the retainer structure embodies certain features of improvement which insure ready conformation thereof to the post and to the bracket and increase the resilient properties without reducing the stiffness.

As the description proceeds it will be evident that the improved mounting may be adapted to other situations in automobile construction, but for an understanding of the invention it is though that the accompanying drawing will illustrate the principle with sufficient clearness to make such other applications obvious to the skilled mechanic.

In the drawing—

Figure 1 is a view partly in side elevation and partly in section of the improved mounting as applied to the dash of a vehicle having an inclined steering post.

Figure 2 is a detail view in front elevation of the improved mounting shown in Figure 1 without any indication of the dash or post.

Figures 3 and 4 are detail views in section taken along the planes indicated by the lines 3—3 and 4—4 respectively of Figure 1 and looking in the direction of the arrows.

Alining brackets for steering posts and the like are, of course, very common in the automobile art but it has been found very difficult and expensive to machine the brackets with such accuracy that, in assembling, they would hold the steering post in predetermined relation to all associated parts. The distances between bearing points along the post are great and large tolerances are required to compensate for irregularities in workmanship. The present invention has, therefore, for its principal object to provide a simple and inexpensive retainer for the steering post which may be incorporated directly within a bracket and compensate for its inherent properties for deficiencies in alinement. As shown, a bracket *a* of any approved size and form is secured, as by bolts *b*, to some part of the vehicle, such as the dash *c*, in proximity to the post *d* or other element to be mounted yieldingly but maintained in predetermined alinement. The bracket *a* is formed with a circular opening *a'* through which the post *d* passes loosely. The particular improvements are concerned with the interposition of a yielding retainer between the post and the bracket, so as to facilitate the assembling of parts with the post in proper alinement and, incidentally, cushion the post after being mounted against vibrations and shocks. To this end, in the preferred form, there is provided a ring $e$ of rubber or other yielding material which seats within the opening $a'$. This rubber is held in place by a retainer $f$ and clamp $g$. The retainer $f$ has an annular flange $f'$ which seats on the bracket $a$ around the opening $a'$, while the internal diameter of the retainer is such as to allow the post $d$ to pass snugly therethrough. The lower edge of the retainer is slotted, as at $f^2$, so as to be of a yielding character and permit it to be pressed against the periphery of the post and to be clamped securely thereagainst. The clamp $g$ has an internal diameter which permits it to slide freely over the lower end of the retainer $f$ and is split so that its free ends $g'$ may be drawn together by means of a clamping bolt $g^2$ and nut $g^3$. The clamping ring $g$ is also preferably formed with an annular flange $g^4$ which may be brought up snugly against the under face of the rubber ring $e$ and bracket $a$ adjacent the opening $a'$.

The construction described is at once inexpensive to manufacture and simple to manipulate in the assembling of the post on the vehicle. The yielding ring $e$, of course, is molded of such diameter as to rest snugly within the opening $a'$, and of such an internal diameter as to receive snugly the retainer $f$. To insure the ready conformation of the ring $e$ to the opening $a'$ and to the retainer $f$ and to increase its resiliency without impairing its stiffness, scallops $e'$, $e^2$, may be molded on its outer and inner peripheries respectively. In assembling, the bracket $a$ will be bolted to the dash $c$ by means of the bolts $b$ and approximately with the opening $a'$ in proper relation to the position which the post $d$ is to be mounted in. Of course, the form of the bracket will depend on the angular position of the post or other element to be mounted. The post may then be slid through the retainer $f$ and clamping ring $g$, the flange $f'$, in the illustrated embodiment, overlying the bracket adjacent the opening $a'$ and the flange $g^4$ lying under the lower face of the bracket adjacent to the opening $a'$. The resilient ring $e$ may be assembled in place on the retainer $f$ or within the opening $a'$, as will be evident when the parts are brought together, the ring $g$ will lie over the slotted edge of the retainer $f$ and may be contracted by proper manipulation of the clamping nut $g^3$, as will be evident, to bind the retainer against the post $d$. The ring $e$ will, at this time, be practically housed by the flanges $f'$ and $g^4$ so as to be protected against the elements and foreign substances and make a sightly finish. During this assembling operation if the parts do not line up properly the yielding ring $e$ will afford the necessary tolerance and automatically conform to the alinement established. In completing the alinement it is unnecessary to bend or otherwise to force any of the parts so as to leave them under injurious stresses. The retaining bearing is the ring $e$ and since this is yielding, its reaction on the post will not leave the latter under destructive stresses. Further, it provides a cushion to absorb vibrations on the post and protect it against shocks. These features are all of importance in meeting conditions of use in that the driver as well as the bracket are relieved from such vibrations and shocks.

Changes in design and other adaptations of the retainer for other parts of a motor vehicle may be made without departing from the spirit of the invention.

I claim as my invention:

1. In a motor vehicle, in combination with an element to be mounted thereon in a predetermined position, a bearing bracket having an opening through which said element extends loosely, a resilient bearing ring between said element and bracket, and a pair of clamping devices movable longitudinally along the said element for clamping the resilient bearing ring in place.

2. In a motor vehicle, in combination with an element to be mounted thereon in a predetermined position, a bearing bracket having an opening through which the said element extends loosely, a resilient bearing ring between said element and bracket, and a pair of clamping devices, one of which telescopes over and grips the other, with the resilient ring clamped between them.

3. In a motor vehicle, in combination with an element to be mounted thereon in a predetermined position, a bearing bracket having an opening through which the element extends loosely, a resilient bearing ring surrounding said element within the bracket opening, a clamping ring extending through the resilient ring, and a second clamping ring which telescopes over the first and grips it, both rings being engageable with the resilient ring to clamp it in place between them.

4. In a motor vehicle, in combination with a steering post, a bearing bracket therefor having an opening through which the post extends loosely, a resilient bearing ring within the opening and interposed between the bracket and the post, a flanged retainer for the ring extending therethrough and adapted to embrace the post, and a flanged clamping ring for securing the retainer between the flanges in operative relation to all of the parts.

5. A mounting for a steering post including a bracket to be secured to the vehicle body and having an opening through which the post extends loosely, a rubber ring mounted within the opening, a retainer extending through the ring and embracing the post and slotted at its lower end, a flange carried with the retainer adapted to overlie the upper edge of the ring and the upper face of the bracket in proximity to the opening, and a clamping ring to maintain the slotted edge of the retainer in engagement with the post, said clamping ring having a flange to lie under the lower edge of the bearing ring and the underside of the bracket in proximity to said opening.

This specification signed this 18th day of November A. D. 1921.

ALFRED F. MASURY.